United States Patent [19]

Schmitt et al.

[11] 4,106,905
[45] Aug. 15, 1978

[54] PROCESS FOR PROVIDING INSULATING COVERS

[75] Inventors: Joseph J. Schmitt; Richard R. Dahlen, both of White Bear Lake; David A. Lindblad, St. Paul, all of Minn.

[73] Assignee: Minnesota Mining and Manufacturing Company, Saint Paul, Minn.

[21] Appl. No.: 712,681

[22] Filed: Aug. 9, 1976

[51] Int. Cl.² .......................... B01J 1/18; F28F 13/00
[52] U.S. Cl. ................................ 21/60.5 R; 164/123; 165/186; 266/120; 428/402
[58] Field of Search ..................... 21/60.5 R; 428/402; 266/120; 164/123; 165/186

[56] References Cited

U.S. PATENT DOCUMENTS

| 2,303,122 | 11/1942 | Heineman | 266/120 |
| 2,553,759 | 5/1951 | Gerger | 428/402 |
| 2,599,268 | 6/1952 | Maculan | 264/67 |
| 2,926,988 | 3/1960 | Hurley | 21/60.5 R |
| 3,290,231 | 12/1966 | Ries et al. | 21/60.5 R |
| 3,612,155 | 10/1971 | Matsuyama | 164/123 |
| 3,633,666 | 1/1972 | Sparks | 165/186 |
| 3,978,269 | 8/1976 | Martin | 428/402 |

FOREIGN PATENT DOCUMENTS

| 2,345,921 | 3/1975 | Fed. Rep. of Germany | 164/123 |
| 1,223,309 | 2/1971 | United Kingdom | 164/123 |

Primary Examiner—Morris O. Wolk
Assistant Examiner—Roger F. Phillips
Attorney, Agent, or Firm—Cruzan Alexander; Donald M. Sell; Edward T. Okubo

[57] ABSTRACT

A process for providing a thermal insulating cover of discrete particles for a container of fluids involves forming a plurality of hollow interior, discrete, ceramic particles, firing the particles at a temperature of at least 350° C and then covering the heated liquid with at least a ⅛ inch thick layer of the fired particles. A potentially improved ceramic thermal insulating particle is also described and contains a hollow interior with a plurality of partitions.

6 Claims, 5 Drawing Figures

PROCESS FOR PROVIDING INSULATING COVERS

BACKGROUND OF THE INVENTION

1. Field of the Invention

The present invention relates in general to insulating covers for liquid baths, and more specifically to the use of hollow interior, discrete particles for forming such a cover.

2. Description of the Prior Art

In many industries it is often necessary to make use of heated process baths utilizing large open liquid surfaces. Solid covers are not practical for use on these baths because it is essential to have ready access to the heated liquid. Yet such baths must be continually maintained at elevated temperatures and are both inefficient and unpleasant to work with because of the loss of heat to the surrounding environment. In addition, they frequently produce unpleasant or toxic vapors which may be a health hazard and also corrode surrounding structures and equipment.

Heretofore, attempts have been made to alleviate the deficiencies of open heated baths with the use of floating expanded vermiculite, carbon, flyash, or polymeric beads on the liquid surface.

Although expanded vermiculite is a good insulator, it is unsuitable in most heated bath applications because it readily wicks many liquids, especially water and molten salt, and sinks to the bottom of the bath. It has also been reported that vermiculite reacts with molten salt to form a sticky, difficult to remove, tar-like substance on the bath surface.

The use of floating granulated carbon also has not proved to be a solution because it either burns in air at elevated temperatures or eventually sinks in lower specific gravity liquids. In the case of molten salt baths, it has been reported that the build up of carbon (which is an electrical conductor) causes short circuiting and premature failure of expensive electrodes. Carbon also presents a serious fire safety hazard if it is dragged into high temperature quench baths containing nitrate or nitrite salts. Carbon is also very dirty to work with and can be difficult to remove from parts.

The use of high surface area flyash base products has not been satisfactory, particularly in molten salt baths, because it often results in the formation of a rigid, difficult to penetrate cover due to salt readily wicking into the high surface area flyash and solidifying. Also, higher density ash particles eventually sink after they have become wetted resulting in rapid sludge formation at the bottom of the bath.

The use of polymeric balls to form a floating insulating cover is limited by their relatively high cost, chemical reactivity and low temperature capability; currently marketed polypropylene balls are limited to a temperature of approximately 120° C.

The present invention relates to the use of hollow interior ceramic particles to form a floating insulating cover that overcomes the drawbacks and problems that the prior art processes possess and provides an effective easily used heat insulating process.

SUMMARY OF THE INVENTION

The present invention provides an improved process for thermally covering a liquid bath with discrete insulating ceramic particles by forming the particles with a hollow interior, firing the particles at a temperature of at least 350° C and covering the bath with at least a ⅛ inch thick layer of the fired particles.

The particles employed in this invention are manufactured from inexpensive, readily available, raw materials. The resulting insulating particles are totally inorganic and thereby chemically stable in most environments. They do not contaminate the bath they insulate and will neither burn nor decompose or significantly change shape at temperatures up to 1425° C. Yet, the hollow particles are strong, easily handled, and clean. Being nonelectrically conductive, they do not cause short circuiting of bath electrodes. Individual particles are sufficiently small in size as to be able to float into narrow gaps around electrodes or fixtures and effectively insulate such areas. Yet, they are large enough that they won't fit into small difficult to clean cavities of objects placed in the bath and have little tendency to stick to vertical surfaces thereof, as would smaller type particles.

During production operations, parts can easily penetrate the floating barrier during their insertion and removal from the bath. Particles which are dragged out in the process can be easily recovered and recycled.

Benefits of employing the floating insulating cover of the present invention include substantially lower operating costs due to reduced energy consumption and evaporative losses, reduced maintenance costs and increased equipment life. The level of annoying toxic vapors in the work area is also reduced thereby improving worker comfort. Because of reduced surface heat loss, recovery times required to reach operating temperature are decreased and production rates can, therefore, be substantially increased.

DESCRIPTION OF THE PREFERRED EMBODIMENTS

The present invention relates to a process in which a number of discrete, hollow interior, ceramic particles are employed to form an easily penetrable, floating, high temperature resistant, insulating cover for heated fluid baths or other such uses wherein low density high temperature resistant particles are needed. The invention is particularly applicable to liquid baths in which parts to be processed are introduced and removed through the top surface of the bath and remain suspended in the bath from an overhead fixture during processing, and to other types of baths in which the use of a solid insulating cover is not practical. The loss of heat and vapor from the surface of liquid baths in the metal and chemical processing industries has been a serious problem because in most situations the use of a solid, impenetrable insulating cover is impractical from a production process standpoint. In addition, solid insulating covers are expensive, and often relatively short-lived in corrosive environments.

The hollow ceramic particles preferably employed in this invention include those described in a pending Harrison application, Ser. No. 546,708, now abandoned, filed Jan. 15, 1976, incorporated herein by reference, and manufactured by the process described therein.

Figure 1:
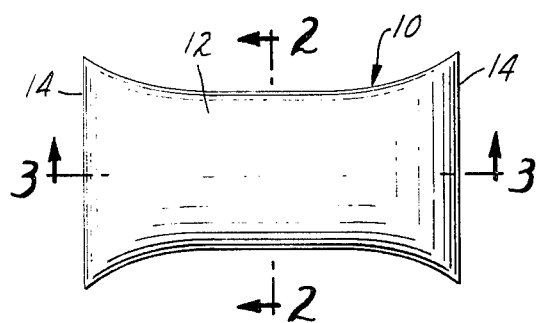
FIG. 1 is a side view of a discrete hollow interior particle used in the process of the present invention.
Figure 2:
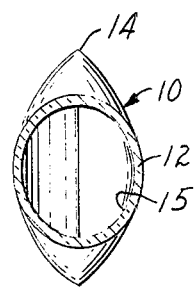
FIG. 2 is a section view taken along the line 2—2 of FIG. 1.
Figure 3:
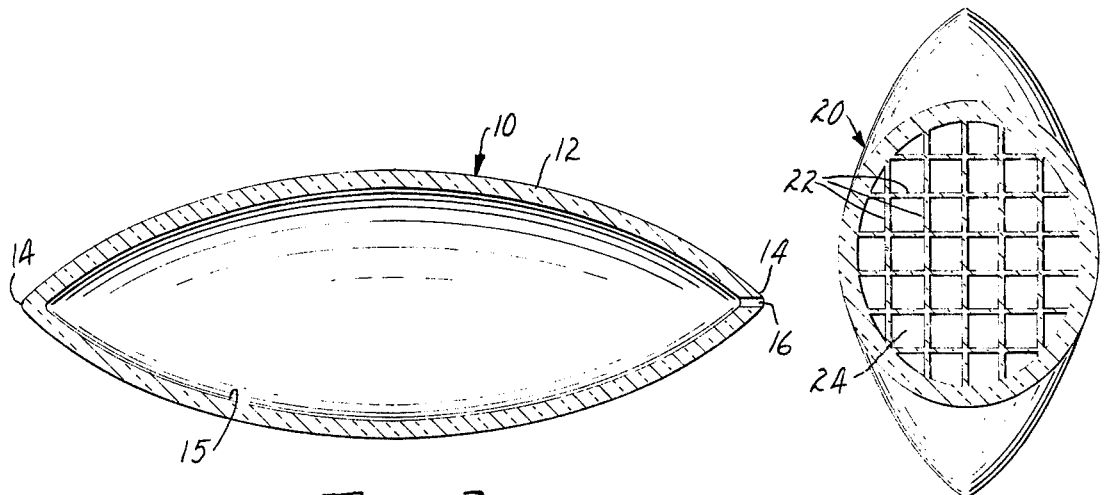
FIG. 3 is an enlarged section view taken along the line 3—3 of FIG. 1.

Referring to FIG. 1, a preferred geometry for the particles is shown in the form of a ceramic pillow 10 having a tubularly-shaped body section 12 whose ends 14 are flattened closed. The pillow 10 has a hollow interior cavity 15 and a rigid shell wall with a substantially uniform thickness. The body section at its midpoint (shown in FIG. 2) is round or substantially round in nature and may be slightly elliptical. As shown most clearly in FIG. 3, one flattened end of the pillow 10 preferably has a minature orifice 16 having a cross sectional area of approximately 0.003 sq. in. that leads to the interior of the pillow for a purpose to be described later. It is presently preferred for providing optimum insulating and operational advantages, that the pillows 10 have approximately a 5/16 in. diameter, a length of 2 in. and a wall thickness of 0.012-0.017 in. in order that the weight of an individual pillow 10 is relatively large to minimize sticking of the pillows to vertical surfaces of parts withdrawn from a bath covered with the pillows. Also, large pillows have less tendency to become lodged in interior cavities of such parts. It has also been found that the pillows should not be made too large in diameter because pillows over 5/16 in. in diameter have a tendency to thermal shock crack when subjected to rapid temperature changes.

Figure 5:
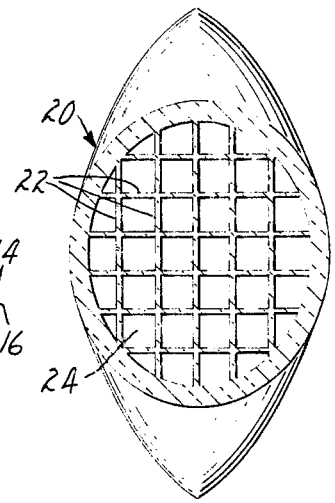
FIG. 5 is an enlarged section view of a preferred embodiment of the present invention.

It has been found that multiple layers of the pillows 10 have particular utility for insulating purposes because the flattened and flared ends 14 thereof prevent high density packing of pillows and assures that a high percentage of void spaces will be present between pillows layered together. Typically the void space is about 40 to 45% between pillows whereas the amount of void space obtainable in a structure of spherical particles is at most about 30% and is even less in structures of other particles (e.g., cylinders, cubes, etc.). The high degree of void space contributes significantly to the thermal insulation qualities of a layer of the pillows 10. Of course, the void space inside the pillows is also very important. In addition to contributing to the lightweight of the pillow, the internal void space also reduces the thermal conductivity of the pillow and increases the thermal properties thereof. It is believed that the thermal insulating qualities of the particles of the present invention may be improved by partitioning the hollow interior thereof, as shown in FIG. 5, wherein a pillow 20 is shown with partitions 22 that extend the entire length of an interior cavity 24.

For purposes of this application the term "ceramic" includes naturally occurring clay earth minerals (both crystalline and amorphous) comprising hydrous silicates of aluminum, iron, and magnesium in the form of fine particles (often colloidal) which are plastic when mixed with sufficient water (i.e., may be deformed under stress without rupturing and will retain the shape produced after removal of the stress) but are rigid when dry. These materials may be mixed with various fillers (e.g. pigments), chemicals, and modifying agents (i.e., iron oxide, feldspars, borax or phosphates to lower the necessary firing temperature) so long as the resulting material can be made plastic with water, shaped into the desired configuration, and then dried without breaking. The term "ceramic" also includes, for high temperature purposes, such materials as silica, alumina, magnesia, zirconia, other refractory metal oxides, carbides and compounds of these substances.

Common preferred clay materials that may be utilized include kaolins, ball clays, montmorillonites, and mixtures thereof. These clays are widely found and are well-known. Common fillers which may be mixed with the clays include materials in the form of fine particles (predominantly less than about 2 microns) such as sand, talc, shale, organic matter, other minerals; etc. The amount of filler which can be used may vary widely depending upon the type of filler used and the desired physical properties in the final clay article. Generally speaking, the amount of filler included (if used at all) is about 20–30% by weight (when using sand), although amounts up to about 80% by weight (e.g., shale, calcined shale, calcined clay) have been used successfully.

The type of clay most preferred for use in forming the particles 10 is a ball clay designated M & D sledge, supplied by the Kentucky-Tennessee Clay Company. The pillows 10 formed from such clay have a low permeability shell and a particle apparent specific gravity in the range of approximately 0.2–0.9. However, by adding micron-sized hollow spherical material such as aluminum silicate flyash to the clay composition, a reduction of the specific gravity of the particle shell wall can be gained to give the particles more buoyancy. For example, an addition of 25 percent by weight of hollow spherical flyash material reduced the shell wall specific gravity from 2.1 to approximately 1.5. Such particles are particularly advantageous for use in molten salt baths having specific gravities greater than 1.5 in order to prevent sinking of the particles.

Figure 4:
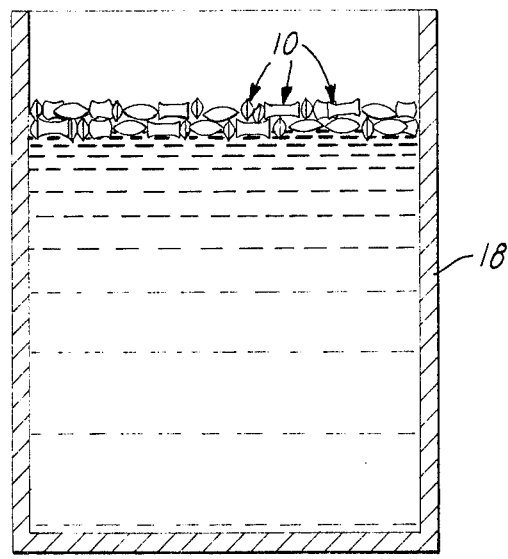
FIG. 4 is a reduced section view of a liquid bath covered with two layers of the particles of FIG. 1.

Although the pillow shape of the particles 10 has been shown to be very functional and is preferred, many other ceramic hollow interior configurations could be employed in the process of the present invention. The reason for the preference of the pillow shape is due to the orifice 16 in the pillow end. The orifice 16 is utilized as a vent in order to permit air to escape from the pillow 10 when placed in a heated bath 18, as shown in FIG. 4. Without the orifices 16, the pillows 10 have a tendency to pop or explode when subjected to rapid temperature changes. Because of the placement of the orifice 16 in the pillow end, a single layer of pillows 10 floating on top of a fluid bath float high enough that the orifices 16 of the pillows forming the layer are out of the fluid so that the pillows do not become filled with fluid. It is preferable to place only a single orifice 16 in each pillow 10 to minimize or entirely preclude the entrance of fluid into pillows forced beneath the fluid surface.

Generally speaking, the strength of the pillow increases with higher firing temperatures. To obtain pillows having maximum strength it is desired to fire them at a higher temperature but below that at which the clay pillows fuse together (preferably about 38° C below this fusing temperature). For most common clays this means that for maximum compressive and tensile strength the pillows should be fired at a temperature of at least 816° C and preferably in a range of about 1093° C to 1371° C, although certain clays (e.g., refined clays) may be fired at higher temperatures but still below their fusing temperature. Of course, the requisite firing temperature may be reduced to as low as 350° C by including in the clay, as a filler or binder, a material such as iron oxide, borax or phosphate cements or the like, but pillows having such composition will have less strength than those fired at higher temperatures.

The reasons for firing the pillows at a temperature below their fusing temperature is twofold. Since the pillows are commonly fired in a batch process, they would become undesirably fused or bonded together if fired at or above their fusing temperature. Furthermore, when the clay fuses or melts it becomes smooth and impervious. It is desirable that the pillows remain slightly pervious, especially at the location of the orifice 16, to aid in the escape of air from the pillows 10 when they are heated.

The utility of this invention from the standpoint of reducing power consumption and increasing production rate capability will be demonstrated in the following examples.

EXAMPLE 1

The following experiment was conducted on a commercial salt bath having an exposed surface area of 12 ft.$^2$ and operating at a temperature of 760° C. The power to the electrodes in the salt bath was controlled by a strip-chart temperature controller/recorder. The power was cycled "ON" and "OFF" at the set point temperature (in this case 760° C). During the "ON" portion of the cycle, the power requirement of the bath remained constant, for all practical purposes, at 77.3 kilovolt-amperes. An elapsed time meter was attached to the controller in such a manner that it would operate during the power "ON" portion of the cycle. By comparing the power "ON" time to real time, the relative energy usage of the bath both with and without the particle insulation was determined.

Approximately 10 gallons (1.34 ft.$^3$ or 40 lbs.) of ceramic hollow interior particles were applied to insulate the bath surface. This resulted in an insulating layer approximately 1.34 inches thick. Immediately upon applying the particles, visible fuming of the salt bath was almost totally eliminated. Comparative electrical power consumption based on relative bath "ON" time is summarized in the Table I below.

TABLE I

|  | NO INSULATION | 1.34" PARTICLE INSULATION |
|---|---|---|
| Power "ON" Time (Hrs.) | 35.0 | 16.8 |
| Real Time (Hrs.) | 55.16 | 49.5 |
| % "ON" Time | 63.5 | 33.9 |
| % reduction in "ON" time, and therefore power usage = 46.5% | | |

EXAMPLE 2

The experiment of Example 1 was repeated except that in this case a bath having an exposed surface area of 8 ft.$^2$ and operating at a temperature of 871° was chosen. A 2 inch thick layer of ceramic hollow interior particles was employed in this experiment. The results are summarized in the following Table II.

TABLE II

|  | NO INSULATION | 2" PARTICLE INSULATION |
|---|---|---|
| Power "ON" Time (Hrs.) | 7.40 | 3.80 |
| Real Time (Hrs.) | 8.08 | 8.00 |
| % "ON" Time | 91.5 | 47.5 |
| % reduction in "ON" time, and therefore power usage = 48.1% | | |

EXAMPLE 3

This experiment was conducted to compare the relative insulating efficiency of a floating carbon cover in combination with a 6 in. thick solid cover, normally employed by a commercial heat treater during idling periods, with a floating ceramic hollow interior particle cover. The salt bath on which the tests were conducted had an exposed surface area of 10.5 ft.$^2$ and was operating at a temperature of 816° C. It was noted that the solid cover was unable to effectively enclose the bath because it did not fit into areas in the vicinity of the immersed electrodes and could not effectively conform to uneven surfaces at the lip of the bath.

|  | Solid Cover + Carbon Cover | 2" Particle Cover Only |
|---|---|---|
| Power "ON" Time (Min.) | 1352.9 | 976.7 |
| Real Time (Min.) | 2640.0 | 2677.0 |
| % "ON" Time | 54.3 | 36.8 |
| % reduction in power usage compared to solid cover + carbon. | | 32.2 |

EXAMPLE 4

This experiment was conducted to determine the effect of ceramic hollow interior particle insulation on the production rate capability of a salt bath having an exposed surface area of 8 ft.$^2$ and operating at a temperature of 843° C. In this case, 230 lb. loads of steel were being heat treated on each cycle. The total cycle time is the summation of the length of time required for the bath to recover to the set point temperature after the cold steel is charged into the bath, and a fixed 20 minute soak time at set point temperature. The bath recovery times, the steel heat-up rate capability, and the overall production rate improvement resulting from the use of both a 1 inch and 2 inch thick layer of floating ceramic particle insulation is summarized in Table IV below.

TABLE IV

|  | Bath Recovery Time (Min.) | Steel Heat-up Rate (Lbs./Min.) | Total Production Rate (Lbs./Min.) |
|---|---|---|---|
| No Insulation | 54 | 4.25 | 3.1 |
| 1" Thick Particle Layer | 30 | 7.66 | 4.6 |
| % Improvement with 1" Thick Particle Layer | 44.5 | 80 | 48.4 |
| 2" Thick Particle Layer | 25.3 | 9.1 | 5.1 |
| % Improvement with 2" Thick Particle Layer | 53 | 114 | 64.5 |

Although the preceding examples demonstrate potential energy saving, reduction in evaporation losses, and potential for increasing production capacity in high temperature salt baths, the process described in this invention could be applied to almost any liquid bath provided the geometry and properties of the particles were optimized for the particular application. For example, the particles could have utility in the ferrous foundry industry to prevent heat loss from the surface of open top ladles during the pouring operation. They could also be used as a "hot topping" material to insulate the exposed surfaces of risers, as a filter for a fluidized bed or in primary steel producing operations to insulate the surface of ladles and tundishes in both ingot molding and continuous casting operations.

Ceramic hollow interior particles also have utility in preventing heat loss from exposed liquid surfaces in the nonferrous metal industries, specifically in melting operations involving aluminum, copper, zinc, and tin. In addition, ceramic hollow interior particles have utility as a floating cover in lower temperature baths to reduce fumes, heat loss, fluid dragout, odor and splashing. Specific areas or processes in which such particles find utility include plating, anodizing, pickling, rinsing, dyeing, phosphating, food processing, sewage treatment, degreasing, and petroleum storage. Furthermore, the invention may have utility in slowing the onset of freezing of water in stock tanks, slowing or minimizing build up of ice in harbors, and lowering the evaporation of water from lakes or reservoirs in hot climates. For these uses, ceramic materials are environmentally compatible since it is a naturally occurring material in almost every area of the earth.

What is claimed is:

1. A process for providing a thermal insulating cover of discrete, hollow, pillow shaped particles over a body of fluid comprising the steps of:

(1) forming a plurality of discrete, hollow interior ceramic particles having a diameter at their substantially circular midpoint of about 5/16 inch and a length ranging from 1.5 to 2 inches;

(2) firing said particles to a temperature of at least 350° C., the average particle density being in the range of 0.2 to 0.9 grams/cc.; and (3) placing said particles on said fluid to form a layer at least ⅛ in. thick on top of said fluid.

2. The process recited in claim 1 wherein said pillow shaped particles are formed with at least one orifice at one end thereof having a cross sectional area of approximately 0.003 sq. in. to permit the exhaustion of heated air from said pillow to prevent exploding of the pillows when placed on the heated liquid and yet substantially inhibit the entry of said liquid into the hollow interior of said particles.

3. A process as recited in claim 1 wherein the ceramic composition of the particles includes as a modifying agent at least one of iron oxide, borax and phosphates.

4. A process as recited in claim 1 wherein said particles are fired at a temperature of at least 816° C.

5. A process as recited in claim 1 wherein the interior of said particles is partitioned to increase the thermal insulating quality of said particles.

6. A process as recited in claim 1 wherein the hollow, discrete particles are formed with a shell wall that includes micron-sized hollow spherical material to reduce the shell wall specific gravity.

* * * * *